United States Patent
Lu et al.

(10) Patent No.: US 8,725,002 B2
(45) Date of Patent: May 13, 2014

(54) METHOD AND SYSTEM FOR TRANSMITTING TIME IN PASSIVE OPTICAL NETWORK

(75) Inventors: Jianxin Lu, Shenzhen (CN); Jingxuan Wang, Shenzhen (CN)

(73) Assignee: ZTE Corporation (CN)

( * ) Notice: Subject to any disclaimer, the term of this patent is extended or adjusted under 35 U.S.C. 154(b) by 100 days.

(21) Appl. No.: 13/257,466

(22) PCT Filed: Sep. 30, 2009

(86) PCT No.: PCT/CN2009/074351
§ 371 (c)(1),
(2), (4) Date: Sep. 19, 2011

(87) PCT Pub. No.: WO2010/105475
PCT Pub. Date: Sep. 23, 2010

(65) Prior Publication Data
US 2012/0008953 A1    Jan. 12, 2012

(30) Foreign Application Priority Data

Mar. 20, 2009    (CN) .......................... 2009 1 0080379

(51) Int. Cl.
*H04B 10/12*    (2006.01)
*H04J 14/00*    (2006.01)

(52) U.S. Cl.
USPC ................. 398/154; 398/66; 398/67; 398/98; 398/102; 398/43; 398/140

(58) Field of Classification Search
None
See application file for complete search history.

(56) References Cited

U.S. PATENT DOCUMENTS

| | | | |
|---|---|---|---|
| 7,925,157 B2 | 4/2011 | Xu et al. | |
| 2007/0237177 A1* | 10/2007 | Endo et al. | 370/468 |
| 2009/0067850 A1* | 3/2009 | Mizutani et al. | 398/154 |
| 2009/0297164 A1* | 12/2009 | Horiuchi | 398/154 |
| 2010/0098433 A1* | 4/2010 | Boyd et al. | 398/155 |

FOREIGN PATENT DOCUMENTS

| | | |
|---|---|---|
| CN | 101192885 A | 6/2008 |
| CN | 101383692 A | 3/2009 |
| JP | 2007295151 A | 11/2007 |

OTHER PUBLICATIONS

2004 IEEE Std 802.3ah-2004 CSMA/CD, 64.2.1.1 Ranging and Timing Process, pp. 427-428. Copyright 2004.
PCT International Search Report dated Jan. 7, 2010, Application No. PCT/2009/074351, Applicant ZTE Corporation et al, 3 Pages.

* cited by examiner

*Primary Examiner* — Ken Vanderpuye
*Assistant Examiner* — Merlin Brito Peguero
(74) *Attorney, Agent, or Firm* — Brooks Kushman P.C.

(57) ABSTRACT

The present invention discloses a method and system for accurate time transfer in PON. An Optical Line Terminal (OLT) ranges Optical Network Units (ONUs) and obtains ranging information, then, triggered by the periodic Pulse per n Second (PPnS), generates a PPnS timestamp based on the local reference counter and the Time of Day (TOD) above second; OLT transmits the ranging information, the periodic PPnS timestamp and TOD to ONUs; ONUs predicts the time of the next second according to said periodic PPnS timestamp, TOD and ranging information, and outputs the corresponding PPnS. The invention is characterized by the combination of the features of PON point to multi-point and PON ranging into its time transfer method, the high accuracy of time transfer, and the low hardware costs for OLT and ONU, as well as the extremely small bandwidth occupancy.

20 Claims, 2 Drawing Sheets

METHOD AND SYSTEM FOR TRANSMITTING TIME IN PASSIVE OPTICAL NETWORK

CROSS-REFERENCE TO RELATED APPLICATIONS

This application is a U.S. national phase of PCT Application No. PCT/CN2009/074351 filed Sep. 30, 2009 which claims priority to Chinese Application No. 200910080379.0 filed Mar. 20, 2009, the disclosures of which are incorporated in their entirety by reference herein.

TECHNICAL FIELD

The present invention relates to the communication field of point-to-multipoint passive optical network (PON), and in particular, to one method and system for accurate time transfer in a passive optical network.

BACKGROUND OF ART

Optical access technology provides large bandwidth and high reliability, and is a development direction of the access technology. PON is one of the major technologies of optical access, where A/BPON, EPON and GPON have been utilized in large scale.

With the rapid development of data services, the mobility requirement of data access has emerged constantly, and the wired and wireless integration will meet the experiences of users better. With full-service access capability of data, voice and Time Division Multiplex (TDM), PON technology can meet wireless access demand in constant evolution. Especially in the access applications of micro-cells and home base stations, the convergency characteristic of PON makes the entire network clear in levels, convenient in construction, efficient in management.

The mobile base stations of CDMA2000, TD-SCDMA and WiMAX etc. have strict requirement on time synchronization. Some value-added services provided by the mobile network also need strict time synchronization. At present, the wireless time service means, such as GPS etc., are mainly used on mobile base stations. In the construction of high quality wireless networks, time service using wired networks has great significance both in economy and in stability.

In the process of IP-based network, the Precision Time Protocol (PTP) of network of IEEE1588 has been widely used in wireless base station. But PTP protocol works better in the condition of symmetric delay in the uplink and downlink of a network, and asymmetric nodes needs to be processed if it is an asymmetric network. PON is an asymmetric network for delay in the uplink and downlink, complicated flow processing, and excessive protocol workload and excessive network bandwidth occupancy occur when PTP protocol is dealt with in PON.

SUMMARY OF THE INVENTION

In view of this, one of the main purposes of the present invention is to provide a method for time transfer in a passive optical network, which is used to solve the technical problems of complicated processing, excessive protocol workload, and excessive network bandwidth occupancy when using PTP to transfer time in a PON.

To achieve the above purposes, the technical scheme of the present invention is implemented by:

A method for time transfer in a passive optical network comprises:

an optical line terminal (OLT) ranging optical network units (ONUs) and obtaining ranging information, then, triggered by a periodic pulse per n second (PPnS), generating a periodic PPnS timestamp and time of day (TOD) above second based on a local reference counter;

the OLT sending said ranging information, the periodic PPnS timestamp and the TOD to the ONU;

the ONUs predicting a time of the next second according to said periodic PPnS timestamp, the TOD and the ranging information, and outputting the PPnS corresponding to the time of the next second.

Furthermore, the step of the ONUs predicting a time of the next second and outputting the corresponding PPnS comprises:

the ONU estimating a PPnS period corresponding to the local reference counter, according to said periodic PPnS timestamp;

the ONU estimating a time corresponding to the next PPnS timestamp according to said PPnS period, the ranging information and the currently received PPnS timestamp, and outputting a PPnS based on the local reference counter; wherein, the time corresponding to said next PPnS timestamp is that a sum of the currently received PPnS timestamp and said PPnS period subtracts half of a value of the ranging information.

Furthermore, the above method further comprises: the OLT ranging the subordinate ONUs periodically, and if finding there is an ONU whose ranging information has been changed, transmitting new ranging information to the ONU whose ranging information has been changed.

Furthermore, said ranging information is unicast to the ONU corresponding to the ranging information by a management plane or service plane, said periodic PPnS timestamp and the TOD are multicast to all the subordinate ONUs by the management plane or service plane.

The present invention also provides an optical line terminal supporting time transfer in a passive optical network, said optical line terminal (OLT) comprising an OLT time processing module, said OLT time processing module configured to generate a periodic pulse per n second (PPnS) timestamp and time of day (TOD) above second based on a local reference counter, triggered by a periodic PPnS; to range optical network units (ONUs) and generate ranging information; to transmit said PPnS timestamp, the TOD and the measured ranging information to the ONUs.

Furthermore, said OLT time processing module comprises:

a time source selecting and processing module configured to select external time sources and covert the selected external time sources into an uniform system clock, a PPnS and the TOD;

an OLT processor configured to range the ONUs and obtain the ranging information according to a passive optical network protocol; and to generate the PPnS timestamp based on the local reference counter according to the system clock and the PPnS inputted by said time source selecting and processing module;

an OLT controller configured to form a data packet from the PPnS timestamp generated by the OLT processor, the TOD outputted by the time source selecting and processing module, and the ranging information measured by the OLT processor, and transmit the data packet to the ONUs through said OLT processor.

Furthermore, said OLT processor comprises:

a timestamp generating module configured to generate the PPnS timestamp based on the local reference counter, according to the PPnS transmitted by said time source selecting and processing module;

a ranging module configured to implement a function of ranging the ONUs and obtain the ranging information, according to the passive optical network protocol;

a protocol processing module configured to implement a processing function of the passive optical network protocol.

Furthermore, said timestamp generating module comprises the reference counter, said timestamp generating module configured to generate the PPnS timestamp using a latch, and latching a value of said reference counter at a rising edge of the PPnS;

said timestamp generating module also configured to use a multi-point control protocol (MPCP) counter as the reference counter in Ethernet Passive Optical Network (EPON); to use a combination of a super frame counter and an intra frame counter in Ident field in GTC frame of transmission convergence layer as the reference counter in Gigabit-Capable Passive Optical Network (GPON).

Furthermore, said OLT time processing module is configured to transmit the ranging information in the way of unicast to the ONU corresponding to the ranging information by a management plane or service plane; and to transmit the PPnS timestamp and TOD in the way of broadcast to all the subordinate ONUs by the management plane or service plane;

said OLT time processing module is also configured to range the ONUs periodically and if finding there is an ONU whose ranging information has been changed, transmit new ranging information to the ONU whose ranging information has been changed.

The present invention also provides an optical network unit supporting time transfer in a passive optical network, said optical network unit (ONU) comprising an ONU time processing module, said ONU time processing module configured to predict a time of the next second according to a periodic pulse per n second (PPnS) timestamp, time of day (TOD) and ranging information transmitted by an optical line terminal (OLT), and to output a PPnS corresponding to the time of the next second.

Furthermore, said ONU time processing module comprises:

an ONU processor configured to receive the periodic PPnS timestamp, the TOD above second and the ranging information transmitted by said OLT, and to provide a reference counter for a time synchronizing module;

an ONU controller configured to estimate a PPnS period based on a local reference counter, according to the periodic PPnS timestamp received by said ONU processor; to estimate a time corresponding to the next PPnS timestamp, according to said PPnS period, the ranging information and the currently received PPnS timestamp;

a time synchronization processing module configured to receive the time corresponding to the next PPnS timestamp transmitted by said ONU controller, and compare the time with the reference counter in the ONU processor, and output the PPnS and the time information synchronously.

Furthermore, working status of said time synchronization processing module is: following status or self-generating status;

in following status, said time synchronization processing module is configured to compare the next PPnS time set by said ONU controller with the reference counter outputted by the ONU processor, to output the PPnS if both are equal, and meanwhile output the current TOD information;

in self-generating status, said time synchronization processing module is configured to self-output the PPnS and TOD information according to a previous PPnS and PPnS time.

The present invention also provides a system for time transfer in a passive optical network, said system comprising the abovementioned optical line terminal and the abovementioned optical network unit.

The invention combines the ranging characteristics of PON in time transfer, thereby having high accuracy in time transfer, and the low hardware cost for OLT and ONU, as well as the extremely small bandwidth occupancy due to the usage of a single copy of PON itself to broadcast the time information.

PREFERRED EMBODIMENTS OF THE PRESENT INVENTION

The preferred examples of the present invention are illustrated below in conjunction with accompanying drawings, and it is appreciated that the preferred examples described herein are only intended for illustration and explanation of the present invention, not for limitation of the present invention.

Figure 1:
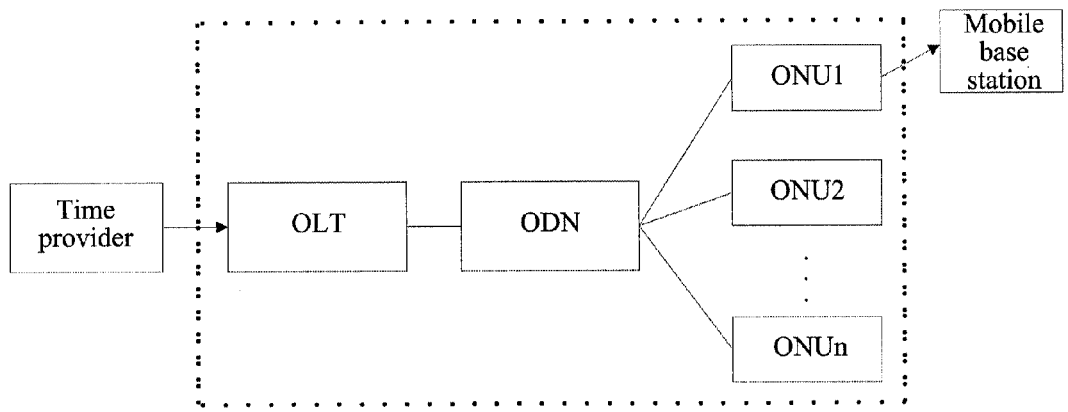
FIG. 1 is a system structure diagram of PON architecture.

FIG. 1 is a system structure diagram of PON architecture, and the PON architecture generally consists of three parts of OLT (Optical Line Terminal), ODN (Optical Distribution Network), and ONU (Optical Network Unit). Generally, the distance from OLT to ONU is quite long, and it is up to 20 km in EPON (Ethernet Passive Optical Network) while it is up to 60 km in GPON (Gigabit-Capable PON). The time provider is commonly a mobile time server or a GPS. The part involved in the technical project of the present invention is in the dashed block, and the OLT time processing module in the present invention is located in the OLT, the ONU time processing module is located in the ONU.

The purpose of the present invention is to transmit the time information of OLT side accurately to ONU side. The time error is required no more than 3 microseconds in the system of CDMA2000 and no more than 1.5 microseconds in the system of TDS-CDMA, while by applying the technical scheme of the present invention, the error of time transfer from OLT to ONU can be implemented no more than 100 nanoseconds.

The time information is divided into the pulse per n second (PPnS) and the time of day (TOD) above second in the system of PON, and is transmitted in conjunction with the characteristics of PON. The core idea of the present invention is: the time information is transferred effectively, economically and accurately, using the characteristics of PON point to multi-point and PON ranging.

Figure 2:
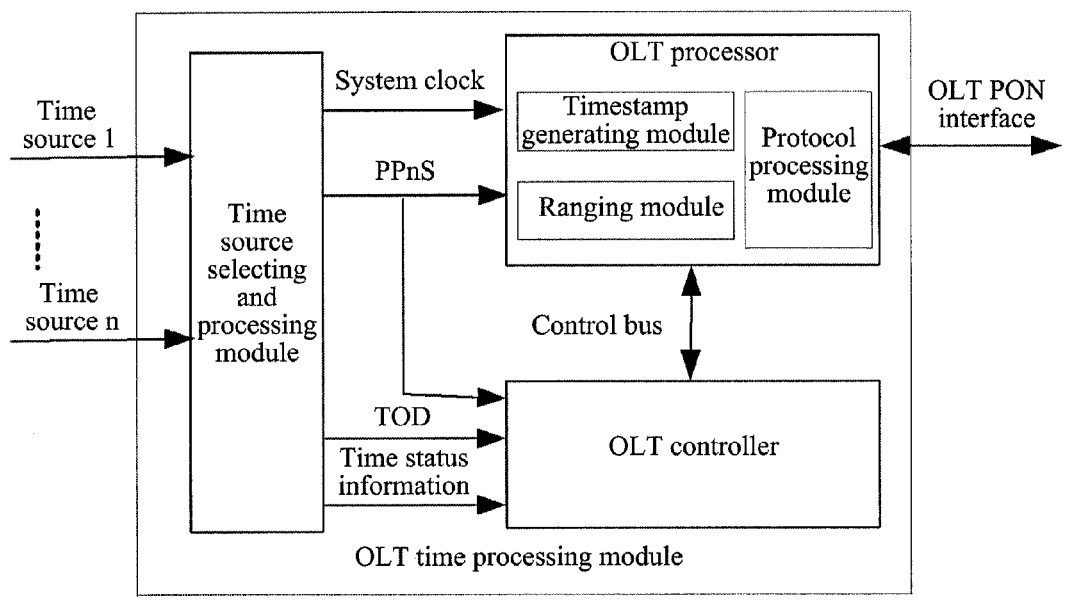
FIG. 2 is a system structure diagram of the OLT time processing module in the system for accurate time transfer of the present invention.

FIG. 2 is a structure diagram of the OLT time processing module in the system for accurate time transfer of the present invention. The OLT time processing module is used to divide the current time into the PPnS and the TOD above second, wherein, the periodic PPnS generates the PPnS timestamp based on the local reference counter, and the corresponding data packets are generated from the PPnS timestamp and the TOD above second and broadcast to all the subordinate ONUs; and each of the subordinate ONU is ranged according to relevant protocol to obtain the ranging information, i.e. Round Trip Time (RTT), and the value of RTT is issued to each ONU in way of unicast. The OLT time processing module comprises: an OLT time source selecting and processing module, an OLT processor and an OLT controller.

The OLT time source selecting and processing module is used to select the time source, wherein, the time source may provide wireless time service, and may also provide wired network time service, this sub-module outputs system clocks in uniform format, TOD above second, and pulse per n second (PPnS, n is a positive integer, generally 1, 2), TOD and PPnS form accurate time information, while the OLT time source selecting and processing module may also output the information of time status, comprising:

{the type, level, status of a clock source; locking instructions of the clock module (tracking, free running and locking)}

TOD contains year, month, day, hour, minute, second corresponding to the current PPnS.

The OLT time source selecting and processing module outputs a system clock as a reference clock of OLT device. It is not necessary for the system clock to synchronize with the time source, if the system clock synchronizes with the time source, however, it facilitates a more accurate output of time information of ONU.

The OLT time source selecting and processing module outputs PPnS, and the PPnS is used to trigger the timestamp generating module to generate the PPnS timestamp corresponding to the PPnS, meanwhile the PPnS triggers the OLT controller as the triggering information transmitted by the PPnS timestamp and the TOD above second.

The OLT processor is used to implement all the functions of OLT interface of passive optical network, and this module provides the ranging function of ONU for time transfer in the present invention to obtain the RTT value of the ranging information. It is a prerequisite of proper operation of the passive optical network to range each ONU accurately since the communication mode of time division multiplex is used in the uplink of the passive optical network.

The OLT processor module further comprises: a timestamp generating module, a ranging module, and a protocol processing module.

The ranging module is used to implement the ranging function according to the passive optical network protocol to obtain the ranging information RTT; the protocol processing module is used to implement the processing function of the passive optical network protocol; the timestamp generating module is used to generate the PPnS timestamp based on the local reference counter according to the PPnS transmitted by said time source selecting and processing module.

The timestamp generating module contains a reference counter, and it is possible for the reference counter to take different forms in different PON systems, and the selecting principle is that the reference counter of OLT correlates with that of ONU, and generally, there is a relatively fixed difference value, which is related to the processing time of hardware and the round trip time (RTT) of physical link, the difference between the reference counter of OLT and that of ONU being approximately RTT/2.

The timestamp generating module generally uses a latch to generate a PPnS timestamp, and locks the value of the reference counter at the rising edge of a PPnS.

For the specific implementation of the reference counter in EPON, a MPCP (Multiple Point Control Protocol) counter defined by IEEE802.3 is selected as the reference counter in the present invention. When EPON sends MPCP data units, it will transmit the current value of the MPCP counter to ONU. Upon reception of MPCP data units, ONU compares the received value of MPCP with that of the local counter, and updates the local MPCP counter if there is a difference. There is a difference of RTT/2+$\Delta$ c between the MPCP counter of ONU and that of OLT, wherein $\Delta$ c is a difference caused by the asymmetry between uplink and downlink during the whole round trip processing, and the difference is commonly quite small and can be compensated partially by test and measurement.

For the specific implementation of the reference counter in GPON, the reference counter to be implemented in the present invention is a combination of a super frame counter and an intra frame counter in Ident field in GPON Transmission Convergence (GTC) layer frame. In a downlink frame of GPON, the frame is sent at the frequency of 8K, and the frame header contains a super frame counter of 30 bit, which increases by one every time when one frame is sent. The intra frame counter counts with the start of GTC frame at frequency of 155.52 MHz, whose period is 19,400. The ONU side reads the current value of a hyper frame from GTC frame, and the intra frame counter is accumulated by itself at a frequency of 155.52 MHz starting from when the GTC frame header is received. Differing from the ranging mechanism of EPON, the ranging mechanism of GPON focuses on the total round trip time for reaching OLT, therefore RTT contains the sending and processing time Ts of ONU, therefore the total delay between the reference counter of ONU and that of OLT is approximately (RTT−Ts)/2, and actual value may be compensated by test and measurement.

The OLT controller is used to obtain the RTT value of each ONU from the OLT processor, and sends it in the way of unicast to each ONU by OLT controller. When RTT of a certain ONU has been changed, ONU will be re-informed.

The OLT controller receives the PPnS triggering information of the time source selecting and processing module, and reads the PPnS timestamp generated by the timestamp generating module, and transmits it together with TOD and time status outputted by the time source selecting and processing module in way of broadcast to all the ONUs by OLT processor. Certainly, alternatively, they may be sent separately.

The above described time-related information sent by the OLT controller may be communicated by PON data (service) plane, may also be communicated by PON management plane. The management plane is used in the specific implementation of the present invention, for example, the extended OAM frame is used specifically in EPON, and OMCC (ONU Manage and Control Channel) is used for transmission in the implementation of GPON. The OLT controller finely tunes timestamp and the RTT value of ONU according to the specific characteristics of system to make the time information outputted by ONU more accurate.

Figure 3:
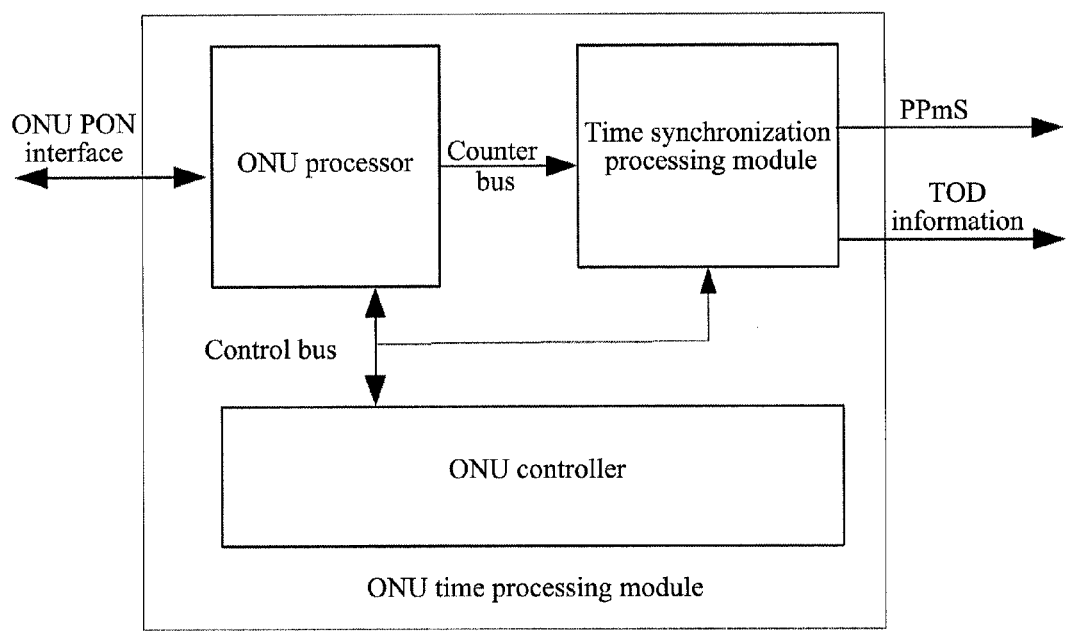
FIG. 3 is a system structure diagram of the ONU time processing module in the system for accurate time transfer of the present invention.

FIG. 3 is an ONU time processing module in the system of accurate time transfer of the present invention, and the ONU time processing module is used to receive the time-related information (the PPnS timestamp, TOD and the information of time status etc.) and RTT value transmitted by OLT side, and output the corresponding accurate PPnS by estimation of period and prediction of the next second time.

The ONU time processing module comprises an ONU processor, an ONU controller, a time synchronization processing module.

The ONU processor is used to implement all the functions of ONU interface of passive optical network, and in the present invention, this module cooperates with the OLT time processing module to implement the ranging function, receives the time-related information sent by the OLT time processing module and provides a reference counter for the time synchronizing and processing module according to the protocol.

The ONU controller is used to implement the following functions:

1, Receive the PPnS timestamp, the ranging information RTT, TOD and the information of time status obtained from OLT side by the ONU processor;

2, Estimate the PPnS period T based on the local reference counter according to the PPnS timestamp sent periodically by OLT side; the estimation method is: performing subtract on each two adjacent PPnS timestamps to obtain the current period of a counter, and making average for the historical periods to obtain T.

3, Estimate time corresponding to the next PPnS timestamp according to the PPnS period T estimated by the ONU, the ranging information RTT of the ONU received from OLT side and the currently received PPnS timestamp (the currently received PPnS timestamp+ T−RTT/2), and set the time value into the time synchronization processing module;

4, Obtain the TOD value of the next second by increasing TOD corresponding to the current PPnS timestamp with 1 second, and set the TOD value of the next second into the time synchronization processing module.

5, Set the working status of the time synchronization processing module according to the received information of time status.

The time synchronization processing module is used to receive the time corresponding to the next PPnS timestamp transmitted by said ONU controller, compare it with the reference counter in said ONU processor, and output the PPnS and the time information synchronously. There are two kinds of working status in time synchronization processing module, the following status and the self-generating status.

Following status: the next PPnS time set by ONU controller and the reference counter outputted by ONU processor are compared, and the PPnS is outputted if they are equal, and at the same time the current TOD information is outputted.

Self-generating status: the PPnS and TOD information are self-outputted according to previous PPnS period and PPnS time. The working status is generated in the conditions of time source loss or anomalies. In the status of self-generating, it is possible for OLT time source to be lost or anomalous temporarily, and then ONU can still output the time information continuously, and maintain the accuracy of time information in a certain period of time.

The present invention provides a method for time transfer in a passive optical network, comprising:

an optical line terminal (OLT) ranging an optical network unit (ONU) to obtain the ranging information, then, triggered by the periodic PPnS, generating the periodic PPnS timestamp and the TOD above second based on the local reference counter;

OLT transferring said ranging information, periodic PPnS timestamp and TOD to ONU;

ONU predicting the time in the next second according to said periodic PPnS timestamp, TOD and the ranging information, and outputting the PPnS corresponding to the next second time.

The time information outputted by ONU time processing module in the present invention is of high accuracy. The time ambiguity introduced to the whole system correlates with the clock cycle of a reference counter, and the difference between the time of ONU and OLT is less than two counted clock cycles in a system with better compensation.

Choice and implementation of a reference counter in EPON/GPON are listed in the preferred examples, but it cannot constitute a limitation of the present invention, neither of EPON and GPON. The above described are merely preferred embodiments of the present invention, and not intended to limit the present invention, and for the person skilled in the art, various modifications and changes may be made to the present invention. Any changes, equivalent replacements, improvements etc. made within the spirit and principle of the present invention, however, are all included in the protection scope of the present invention.

INDUSTRIAL APPLICABILITY

The time information outputted by ONU time processing module in the present invention is of high accuracy. The time ambiguity introduced to the whole system correlates with the clock cycle of a reference counter, and the difference between the time of ONU and OLT is less than two counting clock cycles in a system with better compensation.

What is claimed is:

1. A method for time transfer in a passive optical network, comprising:
    an optical line terminal (OLT) ranging optical network units (ONUs) and obtaining ranging information, then, triggered by a periodic pulse per n second (PPnS), wherein n is a positive integer, generating a periodic PPnS timestamp and time of day (TOD) based on a local reference counter, wherein the TOD includes a year, month, day, hour, minute and second corresponding to a current PPnS;
    the OLT sending said ranging information, the periodic PPnS timestamp and the TOD to the ONU;
    the ONU predicting a time of the next second according to said periodic PPnS timestamp, the TOD and the ranging information, and outputting the PPnS corresponding to the time of the next second.

2. The method according to claim 1 wherein the step of predicting a time of the next second and outputting the PPnS corresponding to the time of the next second comprises:
    The ONU estimating a PPnS period corresponding to the local reference counter, according to said periodic PPnS timestamp;
    the ONU estimating a time corresponding to the next PPnS timestamp according to said PPnS period, the ranging information and the currently received PPnS timestamp, and outputting a PPnS based on the local reference counter;
    wherein the time corresponding to said next PPnS timestamp is that a sum of the currently received PPnS timestamp and said PPnS period subtracts half of a value of the ranging information.

3. The method according to claim 1 further comprising: the OLT ranging the subordinate ONUs periodically, and if finding there is an ONU whose ranging information has been changed, transmitting new ranging information to the ONU whose ranging information has been changed.

4. The method according to claim 3 wherein said ranging information is unicast to the ONU corresponding to the ranging information by a management plane or service plane, said periodic PPnS timestamp and the TOD are multicast to all the subordinate ONUs by the management plane or service plane.

5. An optical line terminal supporting time transfer in a passive optical network, said optical line terminal (OLT) comprising an OLT time processing module, said OLT time processing module configured to generate a periodic pulse per n second (PPnS) timestamp, wherein n is a positive integer, and time of day (TOD) based on a local reference counter, triggered by a periodic PPnS, wherein the TOD includes a year, month, day, hour, minute and second corresponding to a current PPnS; to range optical network units (ONUs) and generate ranging information; and to transmit said PPnS timestamp, the TOD and the measured ranging information to the ONUs.

6. The optical line terminal according to claim 5 wherein said OLT time processing module comprises:
   a time source selecting and processing module configured to select external time sources and covert the selected external time sources into an uniform system clock, a PPnS and the TOD;
   an OLT processor configured to range the ONUs and obtain the ranging information according to a passive optical network protocol; and to generate the PPnS timestamp based on the local reference counter according to the system clock and the PPnS inputted by said time source selecting and processing module; and
   an OLT controller configured to form a data packet from the PPnS timestamp generated by the OLT processor, the TOD outputted by the time source selecting and processing module, and the ranging information measured by the OLT processor, and transmit the data packet to the ONUs through said OLT processor.

7. The optical line terminal according to claim 6 wherein said OLT processor comprises:
   a timestamp generating module configured to generate the PPnS timestamp based on the local reference counter, according to the PPnS transmitted by said time source selecting and processing module;
   a ranging module configured to implement a function of ranging the ONUs and obtain the ranging information, according to the passive optical network protocol;
   a protocol processing module configured to implement a processing function of the passive optical network protocol.

8. The optical line terminal according to claim 7 wherein said timestamp generating module comprises the reference counter,
   said timestamp generating module configured to generate the PPnS timestamp using a latch, and latching a value of said reference counter at a rising edge of the PPnS;
   said timestamp generating module also configured to use a multi-point control protocol (MPCP) counter as the reference counter in Ethernet Passive Optical Network (EPON); to use a combination of a super frame counter and an intra frame counter in Ident field in GTC frame of transmission convergence layer as the reference counter in Gigabit-Capable Passive Optical Network (GPON).

9. The optical line terminal according to claim 5 wherein said OLT time processing module is configured to transmit the ranging information in the way of unicast to the ONU corresponding to the ranging information by a management plane or service plane; and to transmit the PPnS timestamp and TOD in the way of broadcast to all the subordinate ONUs by the management plane or service plane; and wherein said OLT time processing module is also configured to range the ONUs periodically and if finding there is an ONU whose ranging information has been changed, transmit new ranging information to the ONU whose ranging information has been changed.

10. An optical network unit supporting time transfer in a passive optical network, said optical network unit (ONU) comprising an ONU time processing module, said ONU time processing module configured to predict a time of the next second according to a periodic pulse per n second (PPnS) timestamp, wherein n is a positive integer, time of day (TOD) and ranging information transmitted by an optical line terminal (OLT), wherein the TOD includes a year, month, day, hour, minute and second corresponding to a current PPnS, and to output a PPnS corresponding to the time of the next second.

11. The optical network unit according to claim 10 wherein said ONU time processing module comprises:
   an ONU processor configured to receive the periodic PPnS timestamp, the TOD and the ranging information transmitted by said OLT, and to provide a reference counter for a time synchronizing module;
   an ONU controller configured to estimate a PPnS period based on a local reference counter, according to the periodic PPnS timestamp received by said ONU processor, and to estimate a time corresponding to the next PPnS timestamp, according to said PPnS period, the ranging information and the currently received PPnS timestamp; and
   a time synchronization processing module configured to receive the time corresponding to the next PPnS timestamp transmitted by said ONU controller, and compare the time with the reference counter in the ONU processor, and output the PPnS and the time information synchronously.

12. The optical network unit according to claim 11 wherein working status of said time synchronization processing module is following status or self-generating status;
   in following status, said time synchronization processing module is configured to compare the next PPnS time set by said ONU controller with the reference counter outputted by the ONU processor, to output the PPnS if both are equal, and meanwhile output the current TOD information;
   in self-generating status, said time synchronization processing module is configured to self-output the PPnS and TOD information according to a previous PPnS and PPnS time.

13. A system for time transfer in a passive optical network, said system comprising said optical line terminal (OLT) of claim 5.

14. The method according to claim 2 further comprising: the OLT ranging the subordinate ONUs periodically, and if finding there is an ONU whose ranging information has been changed, transmitting new ranging information to the ONU whose ranging information has been changed.

15. The method according to claim 14 wherein said ranging information is unicast to the ONU corresponding to the ranging information by a management plane or service plane, said periodic PPnS timestamp and the TOD are multicast to all the subordinate ONUs by the management plane or service plane.

16. The system for time transfer in a passive optical network according to claim 13, said system further comprising an optical network unit supporting time transfer in a passive optical network, said optical network unit (ONU) comprising an ONU time processing module, said ONU time processing module configured to predict a time of the next second according to a periodic pulse per n second (PPnS) timestamp, wherein n is a positive integer, time of day (TOD) and ranging information transmitted by an optical line terminal (OLT), wherein the TOD includes a year, month, day, hour, minute and second corresponding to a current PPnS, and to output a PPnS corresponding to the time of the next second.

17. The system for time transfer in a passive optical network according to claim 16, wherein said ONU time processing module comprises:

an ONU processor configured to receive the periodic PPnS timestamp, the TOD and the ranging information transmitted by said OLT, and to provide a reference counter for a time synchronizing module;

an ONU controller configured to estimate a PPnS period based on a local reference counter, according to the periodic PPnS timestamp received by said ONU processor, and to estimate a time corresponding to the next PPnS timestamp, according to said PPnS period, the ranging information and the currently received PPnS timestamp; and a time synchronization processing module configured to receive the time corresponding to the next PPnS timestamp transmitted by said ONU controller, and compare the time with the reference counter in the ONU processor, and output the PPnS and the time information synchronously.

18. The system for time transfer in a passive optical network according to claim 17, wherein working status of said time synchronization processing module is following status or self-generating status;

in following status, said time synchronization processing module is configured to compare the next PPnS time set by said ONU controller with the reference counter outputted by the ONU processor, to output the PPnS if both are equal, and meanwhile output the current TOD information;

in self-generating status, said time synchronization processing module is configured to self-output the PPnS and TOD information according to a previous PPnS and PPnS time.

19. The system for time transfer in a passive optical network according to claim 13, wherein said OLT time processing module comprises:

a time source selecting and processing module configured to select external time sources and covert the selected external time sources into an uniform system clock, a PPnS and the TOD;

an OLT processor configured to range the ONUs and obtain the ranging information according to a passive optical network protocol; and to generate the PPnS timestamp based on the local reference counter according to the system clock and the PPnS inputted by said time source selecting and processing module; and an OLT controller configured to form a data packet from the PPnS timestamp generated by the OLT processor, the TOD outputted by the time source selecting and processing module, and the ranging information measured by the OLT processor, and transmit the data packet to the ONUs through said OLT processor.

20. The system for time transfer in a passive optical network according to claim 19, said system further comprising an optical network unit supporting time transfer in a passive optical network, said optical network unit (ONU) comprising an ONU time processing module, said ONU time processing module configured to predict a time of the next second according to a periodic pulse per n second (PPnS) timestamp, wherein n is a positive integer, time of day (TOD) and ranging information transmitted by an optical line terminal (OLT), wherein the TOD includes a year, month, day, hour, minute and second corresponding to a current PPnS, and to output a PPnS corresponding to the time of the next second.

* * * * *

UNITED STATES PATENT AND TRADEMARK OFFICE
CERTIFICATE OF CORRECTION

PATENT NO. : 8,725,002 B2
APPLICATION NO. : 13/257466
DATED : May 13, 2014
INVENTOR(S) : Jianxin Lu et al.

Page 1 of 1

It is certified that error appears in the above-identified patent and that said Letters Patent is hereby corrected as shown below:

In the Claims

Column 12, Line 5, Claim 19:

After "time sources and" delete "covert" and insert -- convert --.

Signed and Sealed this
Ninth Day of September, 2014

Michelle K. Lee
*Deputy Director of the United States Patent and Trademark Office*